United States Patent
Bausch

(10) Patent No.: US 7,357,577 B2
(45) Date of Patent: Apr. 15, 2008

(54) HYDRODYNAMIC BEARING SYSTEM HAVING MEANS FOR MEASURING THE FILLING LEVEL OF THE LUBRICANT

(75) Inventor: Thomas Bausch, Deisslingen-Lauffen (DE)

(73) Assignee: Minebea Co., Ltd., Nagano-ken (JP)

( * ) Notice: Subject to any disclaimer, the term of this patent is extended or adjusted under 35 U.S.C. 154(b) by 207 days.

(21) Appl. No.: 11/199,306

(22) Filed: Aug. 8, 2005

(65) Prior Publication Data
US 2006/0029311 A1 Feb. 9, 2006

(30) Foreign Application Priority Data
Aug. 7, 2004 (DE) ............... 20 2004 012 407 U

(51) Int. Cl.
*F16C 32/06* (2006.01)
(52) U.S. Cl. ............... 384/119; 384/384; 384/107
(58) Field of Classification Search ............... 384/100, 384/107, 114
See application file for complete search history.

(56) References Cited

U.S. PATENT DOCUMENTS 5,715,116 A * 2/1998 Moritan et al. ......... 360/99.08
6,939,046 B2 * 9/2005 Oelsch ................... 384/100
7,056,024 B2 * 6/2006 Weingord et al. ....... 384/100
2005/0100255 A1 * 5/2005 Hafen et al. ............ 384/100

* cited by examiner

Primary Examiner—Thomas R. Hannon
(74) Attorney, Agent, or Firm—Cooper & Dunham LLP

(57) ABSTRACT

The invention relates to a hydrodynamic bearing arrangement, particularly for a spindle motor to drive the platters of a hard disk drive, the bearing arrangement having a shaft and a bearing bush, which, supported by a lubricant circulating between their bearing surfaces, are rotatable with respect to each other, a covering cap being provided that covers an end face and regions of the outside diameter of the bearing bush adjoining this end face. A free space is provided between the bearing bush and the covering cap, the free space being connected to the bearing gap and at least partially filled with lubricant. According to the invention, a channel running substantially in the longitudinal direction of the bearing bush is provided on the outside diameter of the bearing bush, one end of the channel leading into the free space and allowing the filling level of the lubricant in the free space to be measured.

7 Claims, 3 Drawing Sheets

HYDRODYNAMIC BEARING SYSTEM HAVING MEANS FOR MEASURING THE FILLING LEVEL OF THE LUBRICANT

BACKGROUND OF THE INVENTION

The invention relates to a hydrodynamic bearing system. The invention relates in general to a hydrodynamic bearing systems as used, for example, for the rotary bearing of spindle motors to drive the platters of a hard disk drive.

OUTLINE OF THE PRIOR ART

In a hydrodynamic fluid bearing of the kind employed in spindle motors for example, the bearing gap has to be filled with a lubricating fluid, such as oil, before the motor is put into operation for the first time. Here, the filling level of the lubricant in the bearing gap is critical and goes to determine, among other factors, the useful life of the bearing. The bearing gap and the opening used to fill the bearing gap are both very small and lie in the sub-mm range.

In one possible embodiment of such a bearing, the bearing bush is tapered at one of its end faces and an annular recess is formed in continuation on its outer circumference. The area at the end face of the bearing bush and the region of the recess is covered by a covering cap. A concentric free space thus remains between the outer surface of the bearing bush and the inner surface of the covering cap, the free space being connected to the bearing gap and proportionately filled with bearing oil. The oil covers the surfaces of the bush and the covering cap resulting in the formation of a meniscus having a concave surface on the contact surface to the air. The bearing oil found in this space acts as a lubricant reservoir from which evaporated bearing oil is replaced. The portion of the free space not filled with lubricant acts as an equalizing volume in which the bearing oil can expand when its temperature-dependent volume increases as the temperature rises thus causing the fluid level to change. At least one vent hole in the covering cap ensures the equalization of pressure between the space and the surrounding environment. The cohesive forces acting in the fluid of the lubricant, supported by the capillary forces in the bearing gap, make it more difficult for liquid bearing oil to escape from the free space through the vent hole.

To date, it has been extremely difficult, if not impossible, to find an easy and precise means of measuring the filling level of the lubricant in the free space as described above. It has only been possible to identify overfilling when lubricant leaked out of the vent hole. Thus the desired filling level was determined by introducing a precisely measured amount of lubricant.

However, even should the filling level be precisely measured, there was still the risk of lubricant escaping from the bearing region through the vent hole when the bearing was subjected to extreme loads.

SUMMARY OF THE INVENTION

The object of the invention is to submit a hydrodynamic bearing system that provides a simple means of measuring the filling level of the lubricant.

Moreover, the aim is to reduce the risk of lubricant escaping from the bearing region.

This object has been achieved according to the invention by the characteristics outlined.

Beneficial embodiments of the invention are provided in the subordinate claims.

According to the invention, a channel substantially following the axial direction of the bearing bush is provided at the outside diameter of the bearing bush, one end of the channel leading into the free space and thus allowing the filling level of the lubricant in the free space to be measured.

Known visual optic or tactile methods can be used to measure the filling level of the lubricant in the free space, the channel creating suitable access to the free space allowing the position of the meniscus and thus the filling level to be determined.

At the same time, the channel acts as a vent hole so that an additional vent hole need not be provided in the covering cap. Moreover, because there is no longer need for an additional vent hole, the risk of lubricant escaping from the free space is reduced since there remains a largest possible axial spacing between the lubricant meniscus and the channel opening.

It is advantageous if the cross-section of the channel is V-shaped in form, facilitating, on the one hand, its realization in the bearing bush and on the other hand owing to its favorable adhesive properties which make it more difficult for bearing oil to leak out.

In a preferred embodiment of the invention, the channel extends from the free space to the opposite end face of the bearing bush, making it easier for measuring devices to access the free space.

The free space itself is formed on the one hand by an axial spacing between the bearing bush and the covering cap and on the other hand by an annular recess on the outside diameter of the bearing bush, one end of the channel leading into the annular recess in the bearing bush.

The invention will now be described in more detail on the basis of an embodiment with reference to the drawings.

BRIEF DESCRIPTION OF THE DRAWINGS

The spindle motors illustrated in FIGS. 1A and 1B correspond to each other to a large extent with the same components being indicated by the same reference numbers.

DESCRIPTION OF A PREFERRED EMBODIMENT OF THE INVENTION

Figure 1A:
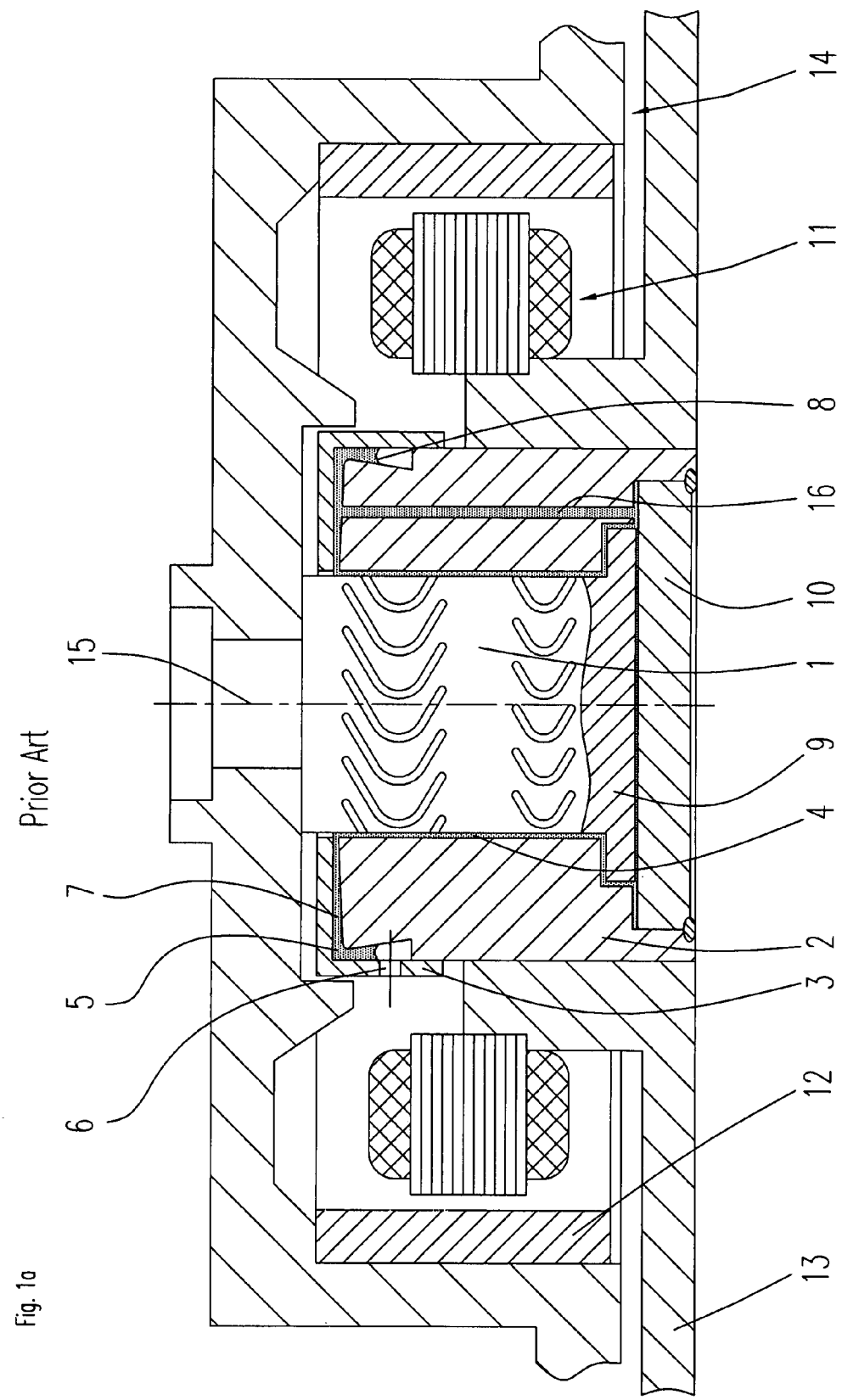
FIG. 1A shows a schematic half-section through a spindle motor having a hydrodynamic bearing arrangement according to document DE 103 52 573 by the same applicant remaining unpublished at the time of application of this invention.
Figure 1B:
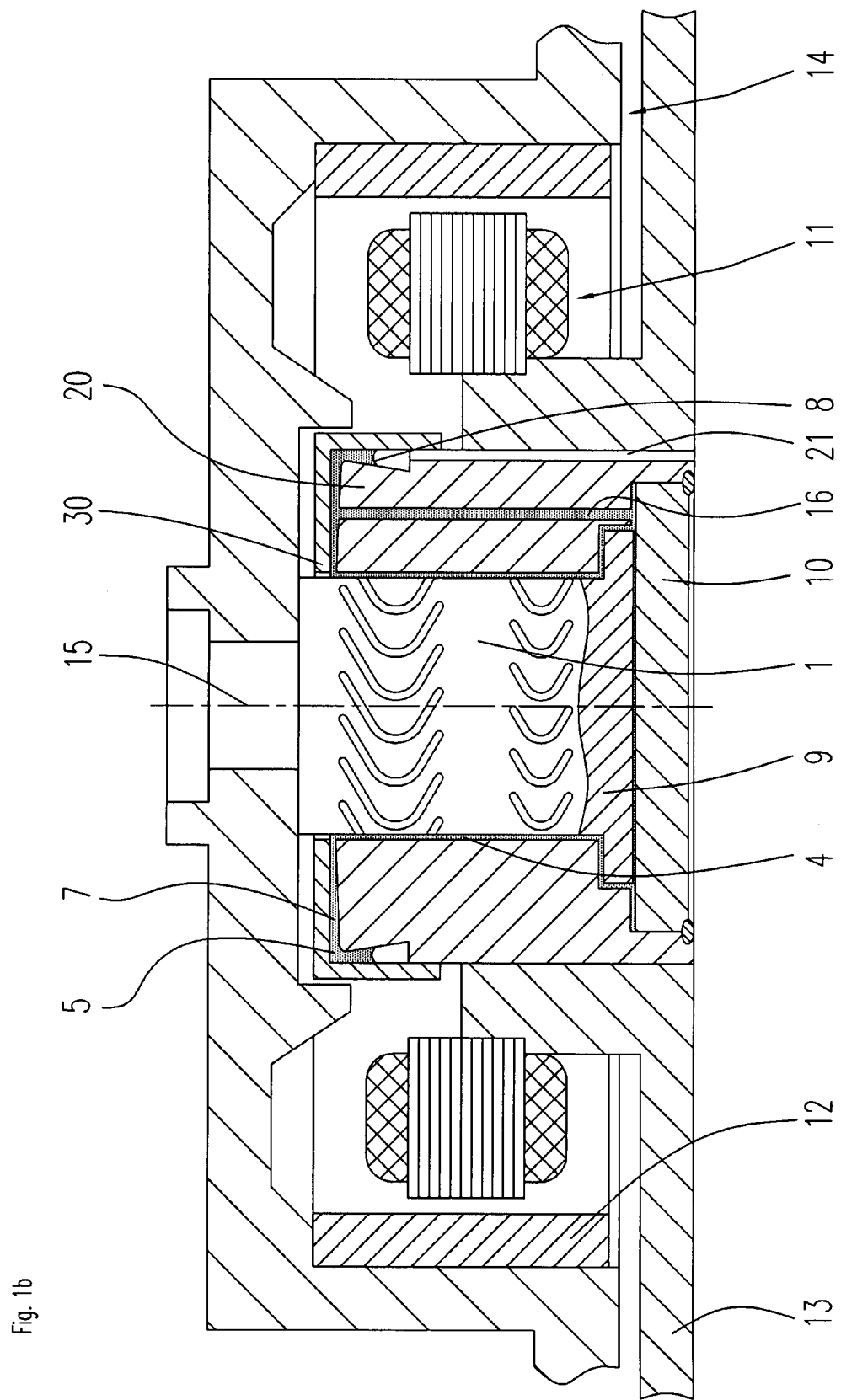
FIG. 1B shows a schematic half-section through a spindle motor having a hydrodynamic bearing arrangement according to the invention.

The spindle motors illustrated in FIGS. 1A and 1B as half-sections comprise a stationary baseplate 13 on which a stator arrangement 11, consisting of a stator core und windings, is disposed. A bearing bush 2 or 20 is fixedly accommodated in a recess in the baseplate 13 and has an axial cylindrical bore in which a shaft 1 is rotatably accommodated. The shaft 1 and the bearing bush 2 or 20 are separated from each other by a lubricant-filled bearing gap 4. The free end of the shaft 1 carries a rotor 14 on which one or more platters (not illustrated) of a hard disk drive can be disposed and secured. An annular permanent magnet 12 having a plurality of pole pairs is arranged at the lower inside edge of the rotor 14, an alternating electrical field being applied to the pole pairs by a stator arrangement 11 spaced apart from them by means of an air gap, so that the rotor 14, together with the shaft 1, can be set in rotation about the rotational axis 15. A thrust plate 9 connected to the shaft 1, together with a counter bearing 10, forms a thrust bearing to take up the axial loads of the bearing arrangement.

In the illustrated embodiments, the bearing bush 2 or 20 is slanted at one of its end faces and an annular recess is formed in continuation on its outside diameter. The area at the end face of the bearing bush 2 or 20 and the region of the recess is covered by a covering cap 3 or 30. A concentric free space 5 is thus created between the outer surface of the bearing bush 2 or 20 and the inner surface of the covering cap 3 or 30, the free space being connected to the bearing gap 4 and proportionately filled with bearing oil. The oil covers the surfaces of the bearing bush 2 or 20 and the covering cap 3 or 30, resulting in the formation of a meniscus 8 having a concave surface on the contact surface to the air. The bearing oil in this space 5 acts as a lubricant reservoir from which evaporated bearing oil is replaced. The portion of the space 5 not filled with lubricant acts as an equalizing volume in which the bearing oil can expand when its temperature-dependent volume increases as the temperature rises thus causing the fluid level to change.

The free space 5 is preferably created, on the one hand, by giving the top end face of the bearing bush 20 a slightly conical shape and on the other hand by providing an annular recess, that increases in the direction towards the lower end of the bearing bush 20, on the outside diameter of the bearing bush 20. Moreover, a bore 16 extending from the free space 5 to the axial bearing region can be provided in the bearing bush 2 or 20, the bore acting as a recirculation channel to improve the circulation of the bearing fluid in the bearing.

According to FIG. 1A, to date at least one vent hole 6 has been provided in the covering cap 3, the vent hole ensuring the equalization of pressure between the free space 5 and the surrounding environment. However, depending on the filling level of the free space and owing to shock or vibration of the bearing, lubricant could escape from the vent hole 6. It was not possible to measure the filling level in the free space for spindle motors according to FIG. 1A.

Figure 2:
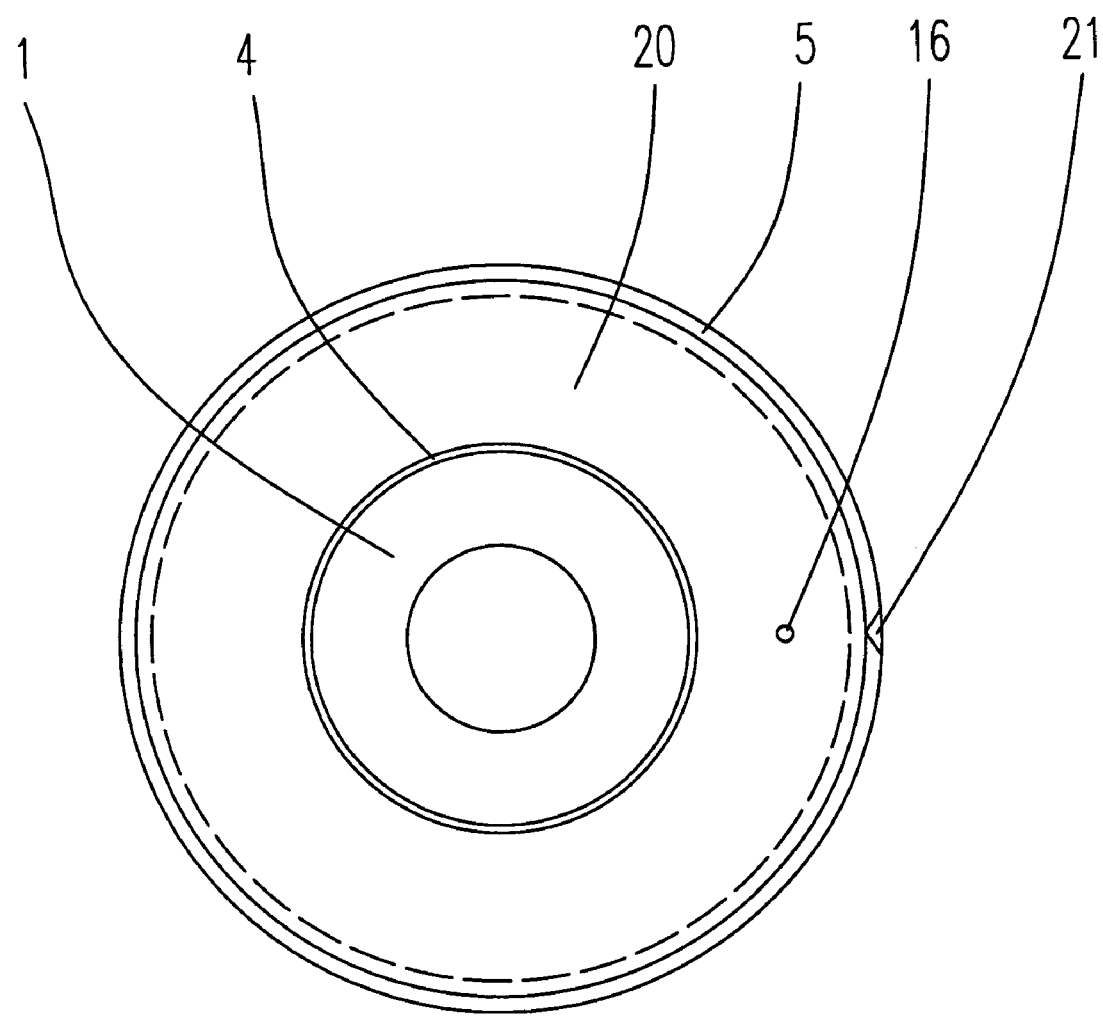
FIG. 2 shows a view from above of a bearing system according to FIG. 1B without a covering cap or rotor.

As can be seen from FIG. 1B on the right hand side of the drawing and FIG. 2, the invention is now based on the fact that a channel 21, running substantially in the longitudinal direction of the bearing bush, i.e. parallel to the rotational axis 15, is provided on the outside diameter of the bearing bush 20, one end of the channel leading into the free space 5. The channel 21 is preferably V-shaped in form and extends from the free space 5 to the opposite end face of the bearing bush 20.

According to the invention, the channel 21 now enables the level of lubricant in the free space to be measured either by visual optic or tactile means, particularly by determining the position of the meniscus in the free space. The channel further acts as a vent hole, so that, compared to FIG. 1A, an additional vent hole need no longer be provided in the covering cap 30. Because there is no longer need for an additional vent hole, the risk of lubricant escaping from the free space is also reduced since a largest possible axial spacing between the lubricant meniscus and the channel opening is achieved.

IDENTIFICATION REFERENCE LIST

1 Shaft
2 Bearing bush
3 Covering cap
4 Bearing gap
5 Free space
6 Vent hole
7 Lubricant
8 Meniscus
9 Thrust plate
10 Counter bearing
11 Stator
12 Magnet
13 Baseplate
14 Rotor
15 Rotational axis
16 Bore
20 Bearing bush
21 Channel
30 Covering cap

The invention claimed is:

1. A hydrodynamic bearing arrangement comprising a spindle motor to drive a disk of a hard disk drive, the bearing arrangement having a shaft (1) and a bearing bush (2; 20), which, supported by a lubricant circulating between their bearing surfaces, are rotatable with respect to each other, a covering cap (30) being provided that covers an end face and regions of an outside diameter of the bearing bush adjoining this end face, a free space (5) being provided between the bearing bush and the covering cap, the free space being connected to a bearing gap (4) and at least partially filled with lubricant, characterized in that a channel (21) running substantially in the longitudinal direction of the bearing bush is provided on the outside diameter of the bearing bush (20), one end of the channel leading into the free space (5) and allowing a filling level of the lubricant in the free space to be measured, characterized in that the free space (5) is formed on the one hand by an axial spacing between the bearing bush (20) and the covering cap (30) and on the other hand by an annular recess on the outside diameter of the bearing bush (20).

2. A hydrodynamic bearing arrangement according to claim 1 characterized in that one end of the channel (21) leads into the annular recess in the bearing bush (20).

3. A hydrodynamic bearing arrangement according to claim 1 characterized in that a recirculation channel taking the form of a bore (16) is provided in the bearing bush (2; 20).

4. A hydrodynamic bearing arrangement comprising a spindle motor to drive a disk of a hard disk drive, the bearing arrangement having a shaft (1) and a bearing bush (20), which, supported by a lubricant circulating between their bearing surfaces, are rotatable with respect to each other, a covering cap (30) being provided that covers an end face and regions of an outside diameter of the bearing bush adjoining this end face, a free space (5) being provided between the bearing bush and the covering cap, the free space being connected to a bearing gap (4) and at least partially filled with lubricant, characterized in that
a V-shaped channel (21) running substantially in the longitudinal direction of the bearing bush is provided on the outside diameter of the bearing bush (20), one end of the channel leading into the free space (5) and allowing a filling level of the lubricant in the free space to be measured and the other end of the channel (21) extending to the opposite end face of the bearing bush (2), wherein the free space (5) is formed on the one hand by an axial spacing between the bearing bush (20) and the covering cap (30) and on the other hand by an annular recess on the outside diameter of the bearing bush (20).

5. A hydrodynamic bearing arrangement according to claim 4, characterized in that one end of the channel (21) leads into the annular recess in the bearing bush (20).

6. A hydrodynamic bearing arrangement according to claim 4, characterized in that a recirculation channel taking the form of a bore (16) is provided in the bearing bush (2; 20).

7. A hydrodynamic bearing arrangement comprising a spindle motor to drive a disk of a hard disk drive, the bearing arrangement having a shaft (1) and a bearing bush (20), which, supported by a lubricant circulating between their bearing surfaces, are rotatable with respect to each other, a covering cap (30) being provided that covers an end face and regions of an outside diameter of the bearing bush adjoining this end face, a free space (5) being provided between the bearing bush and the covering cap, the free space being connected to a bearing gap (4) and at least partially filled with lubricant, characterized in that a channel (21) running substantially in the longitudinal direction of the bearing bush is provided on the outside diameter of the bearing bush (20), one end of the channel leading into the free space (5) and allowing a filling level of the lubricant in the free space to be measured, wherein the free space (5) is formed on the one hand by an axial spacing between the bearing bush (20) and the covering cap (30) and on the other hand by an annular recess on the outside diameter of the bearing bush (20)

characterized in that the channel (21) has a V-shaped cross-section.

\* \* \* \* \*